United States Patent Office 3,418,688
Patented Dec. 31, 1968

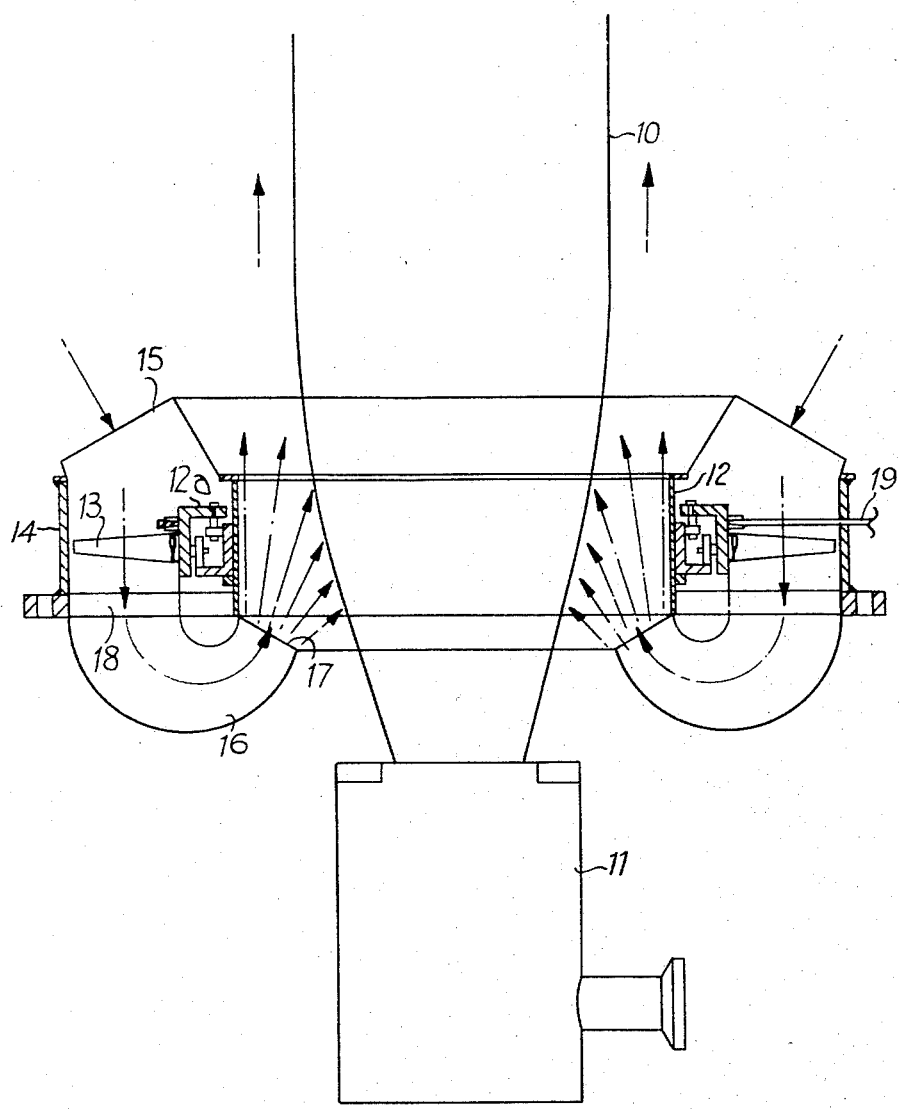

3,418,688
MANUFACTURE OF PLASTIC TUBING
OR SHEETING
Derrick S. Clarke, 440 Hough Fold Way, Harwood,
near Bolton, Lancashire, England
Filed Nov. 29, 1966, Ser. No. 597,684
6 Claims. (Cl. 18—14)

ABSTRACT OF THE DISCLOSURE

Apparatus for manufacture of extruded plastic tubing wherein external air cooling is provided, characterized in that the means for applying external air cooling comprises an axial flow fan with an annular nozzle arranged coaxially of the tubular extrusion, whereby an air stream with a helical component is produced including means, preferably baffles, for adjusting the helical component before it leaves the nozzle.

---

This invention relates to the manufacture of plastic tubing by extrusion and stretching followed by winding into roll form, the tube being split and opened flat, before or after such winding, if sheeting is required.

There are several methods of effecting the stretching of the tubular plastic extrusion to reduce the wall thickness of the tube to the required thickness gauge and thereby also to impart to it, as is known, certain physical characteristics of strength and dimensional stability. But, whatever method is used there is a common known problem in that irregularities occur in the thickness of the tube wall which even when very small can cause any of several forms of distortion both in winding, such as the formation of creases, or after winding due to stresses set up in the roll by reason of such irregularities and which are evident in the finished roll and in the product subsequently taken from such roll, all of which detract from the vendable value of the product.

Hitherto, the main causes of such irregularities has been thought to lie mainly in small irregularities inherent in extruder, as well as in the application of the cooling air current applied to the plastic immediately after extrusion to assist it to set during the stretching operation. To neutralise such inherent extruder causes various proposals have been made to impart a reciprocating rotary motion to the extruder die, or even to the whole extruder, which is both costly and inconvenient, as will readily be appreciated by anyone reasonably skilled in the art.

Equally anyone skilled in the subject of air flow is well aware of the difficulty of providing a continuous and uniformly distributed air stream from an annular outlet, even though great care is taken in the design and construction of ducting leading to such outlet, including devices incorporated in such ducting to induce a high degree of the required uniformity of velocity and direction of emission at the outlet.

The present invention is based upon the result of observation which led the inventor to the conclusion that the uniformity of emission and distribution of the applied external air cooling at present obtainable, though relatively high is not in fact good enough for the particular purpose, owing to the high sensitivity of the plastic material at the stage when such cooling is applied, in particular as regards its lack of dimensional stability.

The object of the present invention is to provide improved uniformity of emission and distribution of the applied external air cooling.

The present invention is based upon a knowledge of the construction of axial flow fans and an appreciation of the possible direct application of such fan to meet the aforesaid problem.

According to the present invention apparatus for the manufacture of extruded plastic tubing by extrusion and stretching combined with applied external air cooling thereof followed by winding into roll form, is characterised in that the means for applying the external air cooling comprises an axial flow fan 14, 15, 16 with annular nozzle 17 arranged coaxially of the tubular extrusion and means (18 not new per se) for reducing the helical component of the air stream before it leaves the said nozzle.

The accompanying drawing shows diagrammatically in section one example of an axial flow fan arranged for applied air cooling to an extruded plastic tube.

As shown in the drawing, the extruded plastic tube 10, upwardly extruded from the die 11, is stretched and expanded in any suitable known manner.

Surrounding said tube is a tubular frame 12 of an axial flow fan having mounting lugs 12a and including blades 13 arranged for downward flow. The casing 14 of the fan has an upper annular intake 15 and a curved annular upwardly directed outlet duct 16 ending in an annular nozzle 17 directed into the annular space between the tubular frame 12 and the plastic tube but at an angle directed against the tube. Within the outlet 16 are baffles 18 arranged in known manner to reduce the helical component of the air stream before it reaches the annular nozzle. The cross section of the fan rotor is arranged to be driven by a belt 19 passing through the fan casing to a suitable power unit, not shown. The axis of the air flow passage between the inlet and the outlet nozzle is substantially semi-torroidal.

In operation, as the tube 10 is being extruded and drawn upwardly in known manner, the axial flow fan is able to produce an ascending annular envelope of air coaxial with the extruded plastic tube, which is not only more uniform as regards direction, velocity and volume than has hitherto been obtainable by the conventional fan and ducting, but has also a controlled small helical factor giving more uniform distribution of the cooling air, relative to the moving tube of film, than has hitherto been obtainable.

What is claimed is:

1. Apparatus for the manufacture of extruded plastic tubing by extrusion and stretching combined with applied external air cooling thereof followed by winding into roll form characterized in that the means for applying the external air cooling comprises an axial flow fan with an annular nozzle arranged coaxially of the tubular extrusion whereby an air stream with a helical component is produced, and means for reducing said component before it leaves said nozzle.

2. Apparatus according to claim 1 further characterized in that the fan has an upper annular intake for down draught intake with curved annular outlet duct ending in an annular upwardly directed nozzle.

3. Apparatus according to claim 2 further characterized in that the nozzle has an angle of direction towards the tube.

4. Apparatus according to claim 2 further characterized in that the annular nozzle is located so as to be directed into the annular space between the body of the fan and the extruded tube.

5. Apparatus according to claim 2 further characterized in that the axis of the annular air flow passage between the inlet and outlet nozzle is substantially semitoroidal.

6. Apparatus according to claim 2, further characterized in that the fan rotor is arranged to be belt driven.

References Cited

UNITED STATES PATENTS

| 2,632,206 | 3/1953 | Pierce | 18—145 XR |
| 2,770,009 | 11/1956 | Rogal et al. | 18—145 |
| 2,947,031 | 8/1960 | Ho Chow et al. | 18—145 XR |
| 3,167,814 | 2/1965 | Corbett | 18—145 |
| 3,296,343 | 1/1967 | Buttolph et al. | 18—145 XR |

WILLIAM J. STEPHENSON, *Primary Examiner.*